United States Patent
Jang et al.

(10) Patent No.: US 8,463,640 B2
(45) Date of Patent: Jun. 11, 2013

(54) METHOD AND APPARTUS FOR ADAPTIVELY UPDATING RECOMMEND USER GROUP

(75) Inventors: Jeong-rok Jang, Suwon-si (KR); Cheol-ju Hwang, Yongin-si (KR); Jae-hwang Lee, Seoul (KR); Min-ho Lee, Gwacheon-si (KR); Sung-hwan Choi, Seoul (KR); Sang-wook Cho, Suwon-si (KR); Yun-ju Choe, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 592 days.

(21) Appl. No.: 12/349,117

(22) Filed: Jan. 6, 2009

(65) Prior Publication Data
US 2009/0193015 A1    Jul. 30, 2009

(30) Foreign Application Priority Data
Jan. 28, 2008    (KR) .................. 10-2008-0008589

(51) Int. Cl.
*G06Q 10/00*    (2006.01)
(52) U.S. Cl.
USPC ................. 705/7.38; 705/7.11; 705/7.39
(58) Field of Classification Search
None
See application file for complete search history.

(56) References Cited

U.S. PATENT DOCUMENTS

| | | | | |
|---|---|---|---|---|
| 5,872,850 A * | 2/1999 | Klein et al. | ............... | 705/51 |
| 7,043,461 B2 * | 5/2006 | Kehder et al. | ............ | 706/13 |
| 7,387,254 B2 * | 6/2008 | Saito | .............. | 235/472.01 |
| 2002/0091605 A1 * | 7/2002 | Labe et al. | ............. | 705/36 |
| 2003/0004903 A1 * | 1/2003 | Kehder et al. | ........... | 706/13 |
| 2003/0088871 A1 * | 5/2003 | Kimura | ...................... | 725/46 |
| 2004/0003392 A1 | 1/2004 | Trajkovic et al. | | |
| 2005/0144499 A1 * | 6/2005 | Narahara et al. | ............ | 714/1 |
| 2006/0047794 A1 * | 3/2006 | Jezierski | ................. | 709/221 |
| 2006/0229090 A1 * | 10/2006 | LaDue | ...................... | 455/507 |
| 2007/0050192 A1 | 3/2007 | Gutta et al. | | |
| 2008/0140716 A1 * | 6/2008 | Saito et al. | ............ | 707/104.1 |
| 2010/0066540 A1 * | 3/2010 | Theobald et al. | ........ | 340/573.1 |
| 2010/0088649 A1 * | 4/2010 | Kemp | ..................... | 715/845 |

FOREIGN PATENT DOCUMENTS

| | | |
|---|---|---|
| JP | 2001-075972 | 3/2001 |
| KR | 10-2005-0013607 A | 2/2005 |
| KR | 10-2006-0103909 A | 10/2006 |

OTHER PUBLICATIONS

Korean Notice of Allowance dated Apr. 26, 2012 issued in corresponding Korean Patent Application 10-2008-0008589.

* cited by examiner

*Primary Examiner* — Leland Marcus
(74) *Attorney, Agent, or Firm* — Staas & Halsey LLP (57) ABSTRACT

A method of adaptively updating a first recommended user group list of a first user connected to a network, in which a predetermined number of second users are selected from the first recommend user group list that is a list of users having a high similarity to the first user in consuming contents. A predetermined number of third users having a high similarity to the first user is selected from second recommend user group lists respectively of the selected second users possess. The first recommend user group list is updated to include the selected third users. As the preference of a user changes, the recommend user group may be reconfigured with updated recommend users by reflecting a corresponding preference. Also, quality contents can be provided by recommending a user of a corresponding terminal with the contents preferred by other users in the updated recommend user group list.

27 Claims, 6 Drawing Sheets

METHOD AND APPARTUS FOR ADAPTIVELY UPDATING RECOMMEND USER GROUP

CROSS-REFERENCE TO RELATED APPLICATION

This application claims the benefit of Korean Patent Application No. 2008-8589, filed Jan. 28, 2008 in the Korean Intellectual Property Office, the disclosure of which is incorporated herein by reference.

BACKGROUND OF THE INVENTION

1. Field of the Invention

Aspects of the present invention relate to a method of adaptively updating a recommend user group (RUG), and more particularly, to a method and apparatus to adaptively update an RUG that enables an active user to continuously keep a highly reliable list of RUGs by adaptively updating the RUG to anticipate the active user's contents preference. More specifically, aspects of the present invention relate to the field of a recommend system and a collaborative filtering. In particular, aspects of the present invention relate to a method of anticipating a contents preference to selectively provide users with useful information among a huge amount of multimedia contents (for example, culture contents including numerous broadcasting channels, movies, dramas, and music based on digital broadcasts and product contents based on home shopping).

2. Description of the Related Art

Due to an increase in an amount of contents, it is difficult for an individual to search for useful information regarding the contents. Accordingly, a variety of methods of anticipating a user's preferences for corresponding contents have been proposed. Of these methods, a method of generating a user group indicating similar preferences based on a user preference profile of a computer or terminal and receiving contents from users of a corresponding group is widely used.

Figure 1:
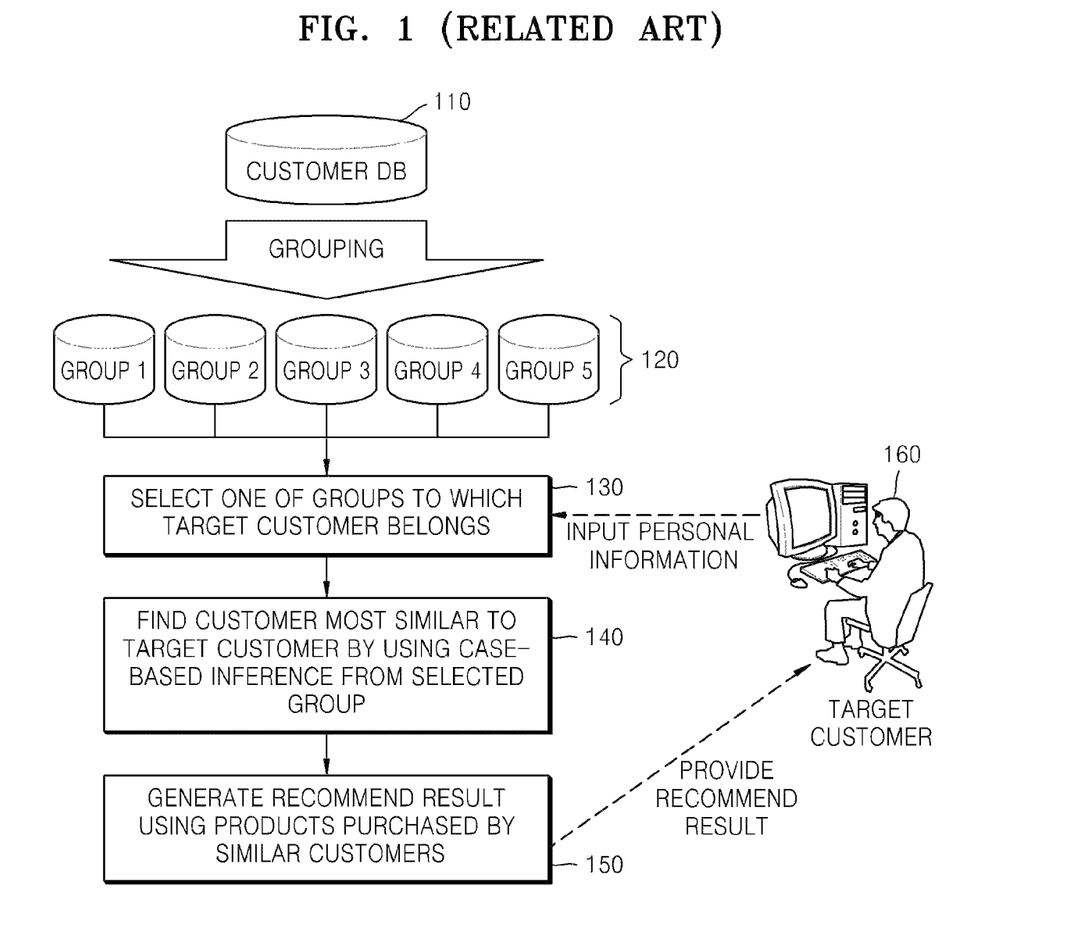
FIG. 1 illustrates a method of classifying users in groups and recommending contents based on a server according to a conventional technology.

FIG. 1 illustrates a method of classifying users in groups and recommending contents based on a server according to a conventional technology. Referring to FIG. 1, a customer database DB 110 to manage data of customers is provided in a web server providing contents (such as home shopping or news). In FIG. 1, the customer database DB 110 is a database including basic information of users and information on the user's activities on a corresponding web server. The groups 120 each signify a group of users having a similar preference that is generated based on the customer database DB 110. Specifically, a contents provider efficiently manages customers by dividing the customers into a variety of groups 120 using the customer database 110. When a customer 160 uses a corresponding server, the customer 160 accesses a network (such as an Internet web server of a contents provider) and inputs personal information. The contents provider analyzes the information and a record about the customer's activities and selects a group to which the customer 160 belongs in operation 130. Next, other customers who are more similar to the target customer 160 are searched for in a selected group by using a case-based inference or pattern-based inference in operation 140. Finally, a recommendation result is generated using products the similar customers purchased and provided to the target customer 160.

According to the above processes, a user accesses a web server through a login process by inputting an ID and a password. Furthermore, the user processes a series of operations according to the characteristics of the web server. For example, when accessing an e-commerce site such as AMAZON, the user searches for a desired item and performs a general process (such as a purchase or a check for a wish list) based on a result of the search. The web server may determine a propensity of a corresponding user by analyzing a series of a user's movements and actions in the above operations. For example, assuming that a site that the user accesses is an electronic commerce site, the propensity of the user may be determined based on information such as items the user searched for or items the user directly viewed, purchased, or added in a wish list from a search result.

The web server analyzes the propensity of all users registered on the web server and manages the users by classifying users having a similar propensity in groups 120. The users belonging to the web server are classified in each of the groups 120 through the above process. Then, the web server provides a service customized to each user according to the characteristic of the group to which the user belongs.

However, the above conventional recommendation system has the following problems. The conventional technology has a limitation of the web server. For example, when groups 120 are generated based on users belonging to a first web server, if the user accesses a second web server, another user group needs to be generated and data of the first web server is not sufficient. Also, according to the conventional technology, since the propensity of a user is determined based on the activities on the web server, not from a computer or a network terminal used by the user, the propensity of a user may not be appropriately reflected. For example, a web server providing personal services (such as blogs) provides the personal services by analyzing the preferences of a user who accesses the web server and directly selects items or other propensities of the user acting on the web server. However, the web server cannot analyze and reflect the items selected or activities performed by the user outside of the web server.

SUMMARY OF THE INVENTION

Aspects of the present invention provide a method and apparatus to adaptively update information on a recommend user group of an active user in a peer-to-peer network environment, so as to allow the active user to continuously maintain a list of the recommend user groups having a higher reliability.

According to an aspect of the present invention, there is provided a method of adaptively updating a first recommend user group list of a first user connected to a network, the method including: selecting a predetermined number of second users from the first recommend user group list, the first recommend user group list including users having a high similarity to the first user in consuming contents; selecting a predetermined number of third users having a relatively high similarity to the first user from second recommend user group lists respectively of the selected second users, as compared to non-selected users from the second recommend user group lists; and updating the first recommend user group list to include the selected third users.

According to an aspect of the present invention, the selecting of the second user may include comparing a first profile that is meta data information indicating a contents consuming propensity of the first user with each of second profiles respectively of other users including the second user in the first recommend user group list.

According to an aspect of the present invention, the predetermined number of the second users may be selected in order of highest similarity in consuming the contents based on a result of the comparison of the first profile with each of the second profiles.

According to an aspect of the present invention, the selecting of the third users may include receiving second recommend user group lists respectively of the selected second users, and comparing the first profile of the first user and a third profile of other users in the received second recommend user group lists.

According to an aspect of the present invention, the predetermined number of the third users may be selected in order of highest similarity based on a result of the comparison between the first profile and each of the third profiles.

According to an aspect of the present invention, the updating of the recommend user group list may include selecting a predetermined number of fourth users having a lowest similarity from the first recommend user group list based on a result of the comparison of the first profile with each of the second profile; and updating the first recommend user group list to include the selected third users instead of the selected fourth users.

According to an aspect of the present invention, the first recommend user group list may be periodically and automatically updated.

According to another aspect of the present invention, there is provided an apparatus to adaptively update a first recommend user group list of a first user connected to a network, the apparatus including: a first selection unit to select a predetermined number of second users from the first recommend user group list that is a list of users having a high similarity to the first user in consuming contents; a second selection unit to select a predetermined number of third users having a relatively higher similarity to the first user from second recommend user group lists respectively of the selected second users; and a recommend user group updating unit to update the first recommend user group list to include the selected third users.

According to an aspect of the present invention, the first selection unit may include a first comparison unit to compare a first profile that is meta data information indicating a contents consuming propensity of the first user with each of second profiles of other users in the first recommend user group list.

According to an aspect of the present invention, the first selection unit may select the predetermined number of the second users in order of highest similarity in consuming the contents based on a result of the comparison by the first comparison unit.

According to an aspect of the present invention, the apparatus may further include a network interface to receive second recommend user group lists respectively of the selected second users, wherein the second selection unit may include a second comparison unit to compare the first profile of the first user with each of third profiles of other users in the received second recommend user group lists.

According to an aspect of the present invention, the second selection unit may select the predetermined number of the third users in order of highest similarity based on a result of the comparison by the second comparison unit.

According to an aspect of the present invention, the recommend user group updating unit may update the first recommend user group list to include the selected third users instead of a predetermined number of fourth users having a lowest similarity selected from the first recommend user group list, based on a result of the comparison of the first profile with each of the second profiles by the first comparison unit.

According to another aspect of the present invention, there is provided a computer readable recording medium recording a program for implementing the method, in which the method includes: selecting a predetermined number of second users from a first recommend user group list that is a list of users having a high similarity to a first user in consuming contents; selecting a predetermined number of third users having a relatively highest similarity to the first user from second recommend user group lists respectively of the selected second users; and updating the first recommend user group list to include the selected third users.

According to yet another aspect of the present invention, there is provided a method of adaptively updating a first recommend user group list of a first user connected to a network, the method including: selecting a predetermined number of third users having a relatively high similarity to the first user from second recommend user group lists respectively of second users listed in the first recommend user group list, the first recommend user group list comprising a list of users having a high similarity to the first user in consuming contents; and updating the first recommend user group list to include the selected predetermined number of third users.

According to still another aspect of the present invention, there is provided an apparatus to provide a first recommend user group list of a first user to a second user connected to a network such that the second user can select a predetermined number of third users having a relatively high similarity to the second user from the first recommend user group list in order to update a second recommend user group list of the second user, the apparatus including: a network interface to receive from the second user a request for the first recommend user group, and to transmit, to the second user, the first recommend user group list comprising a list of users having a high similarity to the first user; and a controller to control the transmission of the first recommend user group according to the received request from the first user.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Aspects of the present invention relate to a method of updating a recommend user group (RUG) having a preference similar to that of a user who uses a computer or a terminal capable of network communicating in a system for recommending user contents where the preference of a user is reflected. The preference of a user changes according to a passage of time. Aspects of the present invention are based on a concept that the RUG is reconfigured with users suitable for a corresponding preference according to the change of the preference of the user.

Figure 2:
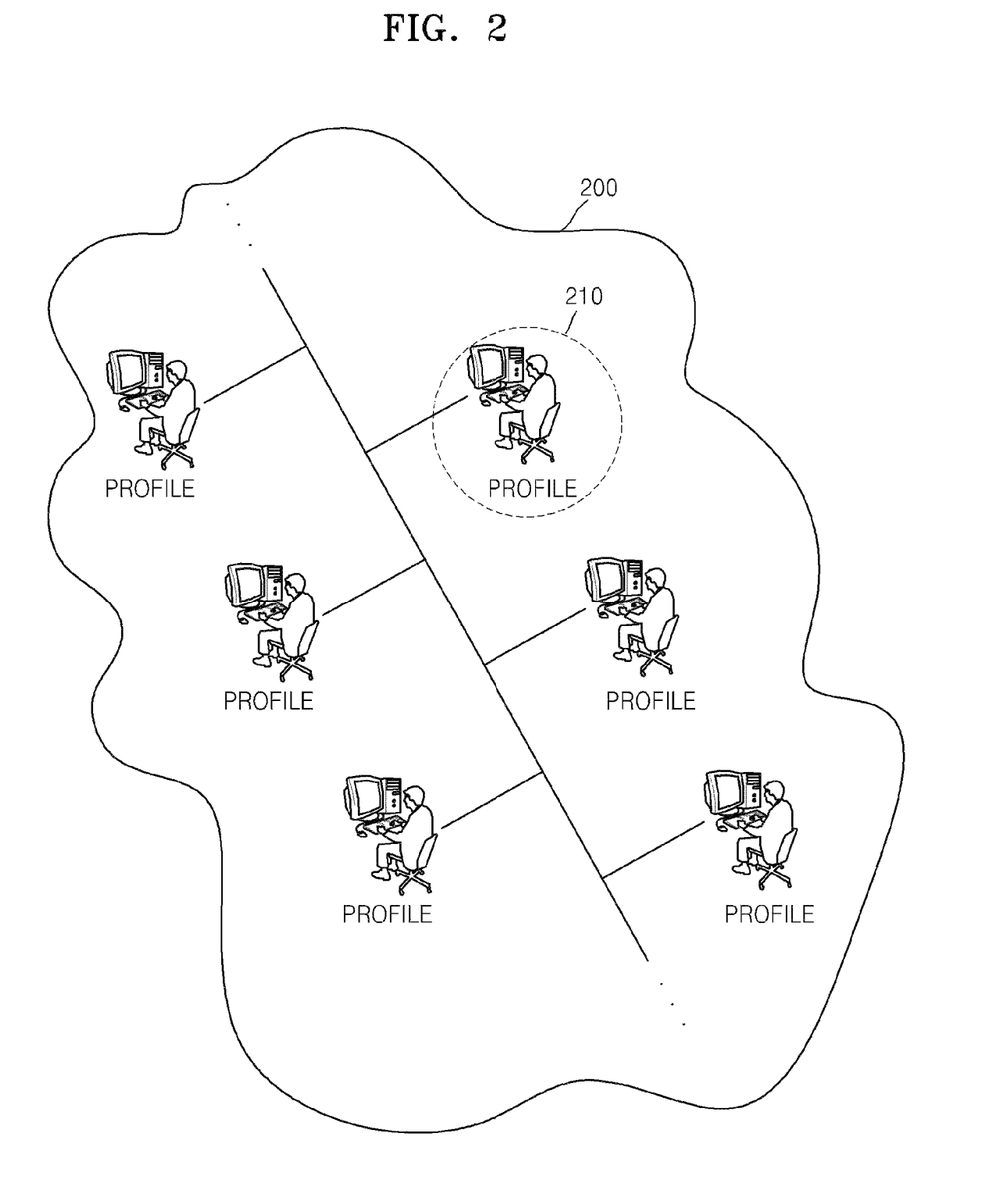
FIG. 2 illustrates a peer-to-peer network environment according to an embodiment of the present invention.

FIG. 2 illustrates a peer-to-peer network environment according to an embodiment of the present invention. Referring to FIG. 2, a network 200 of the peer-to-peer network environment does not include a centralized server. Rather, a plurality of users 210 are connected to one another through the network 200. Each of the users 210 has a corresponding user profile. The user profile is a type of meta data indicating a propensity to consume (for example, a propensity to view, to purchase, to download, etc.) of contents by the user. In aspects of the present invention, a similarity or suitability between the users 210 is evaluated using a user profile, which will be described later. While described as lacking a centralized server, it is understood that aspects can be implemented in cooperation with one or more servers. While not required in all aspects, the users 210 can be connected via wired and/or wireless networks using computers, phones, media players, etc.

Figure 3:
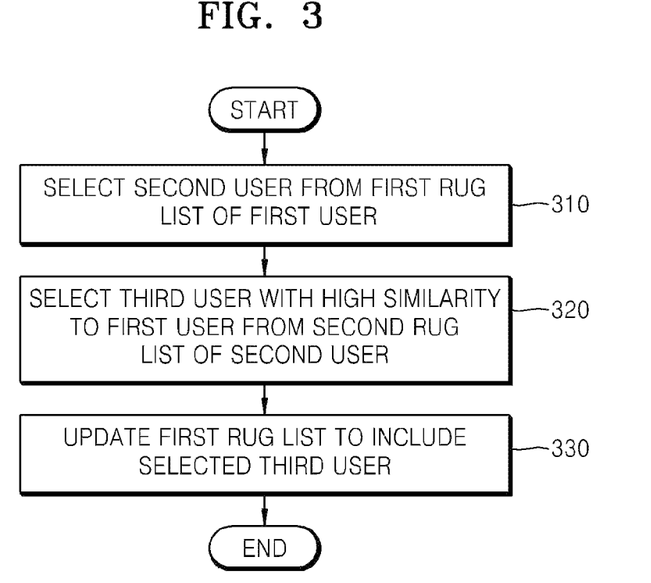
FIG. 3 is a flowchart explaining a method of adaptively updating a recommended user group according to an embodiment of the present invention.

FIG. 3 is a flowchart explaining a method of adaptively updating a recommend user group (RUG) according to an embodiment of the present invention. Referring to FIG. 3, a predetermined number of second users are selected from a first RUG list, which is a list of users having a high similarity to a first user in consuming contents, in operation 310. A predetermined number of third users having a high similarity to the first user are selected from second RUG lists of the selected second users in operation 320. The first RUG list is updated to include the selected third users in operation 330. According to an aspect of the present invention, the propensity of a user using a computer or terminal capable of network communication is generated as a profile through explicit or implicit feedback. Thus, the profile of a user exists in each terminal capable of network communicating to be shared through the network.

The user generates an RUG of users having a similar propensity manually or automatically. Since the contents evaluated to be good (for example, having a high propensity) by the users of the RUG are likely to be evaluated to be good by the user, the contents may be useful for recommending other contents later. However, the propensity of a user changes as time passes. When a new profile of a user is generated based on the change, the propensity of the user for the contents may differ from those of the other users in the current RUG. According to a predetermined time period or according to a user's control, a similarity or suitability is evaluated based on the changed propensity of the user and the propensity of the other users in the current RUG. The similarity values obtained from the evaluation of how much the propensities of the users are similar to one another are compared. The RUG including users having the most similar propensities to the user may be continuously updated and maintained through the above comparison process.

Figure 4A:
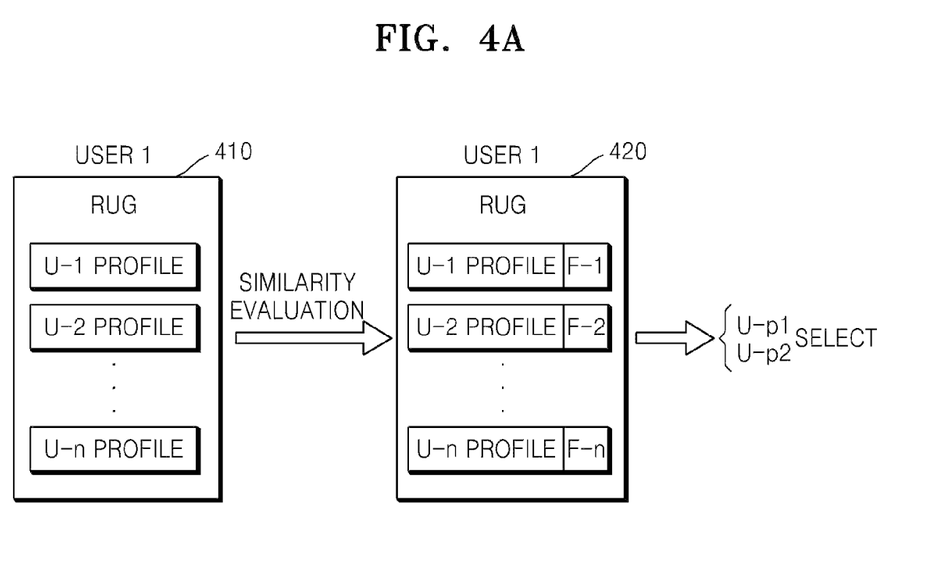
FIGS. 4A, 4B, and 4C illustrate an operational processes of updating a recommended user group list according to an embodiment of the present invention.
Figure 4B:
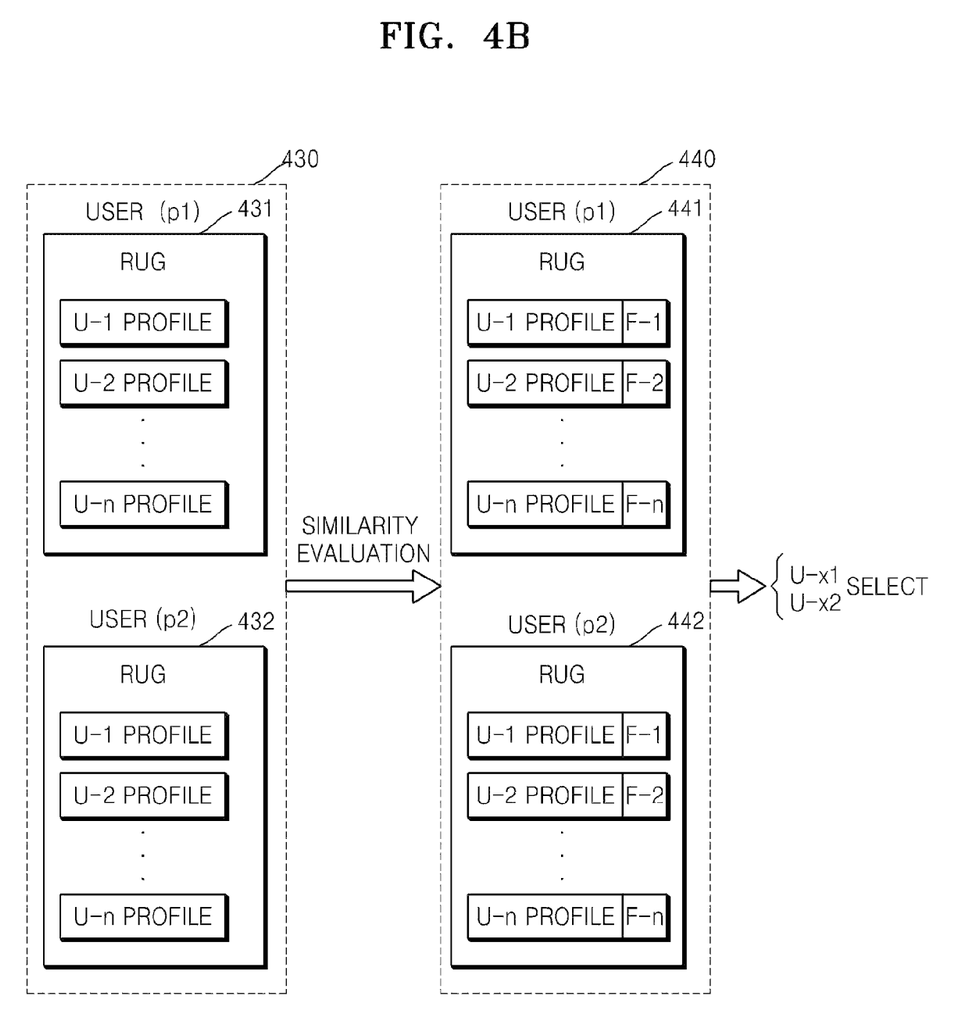
Figure 4C:
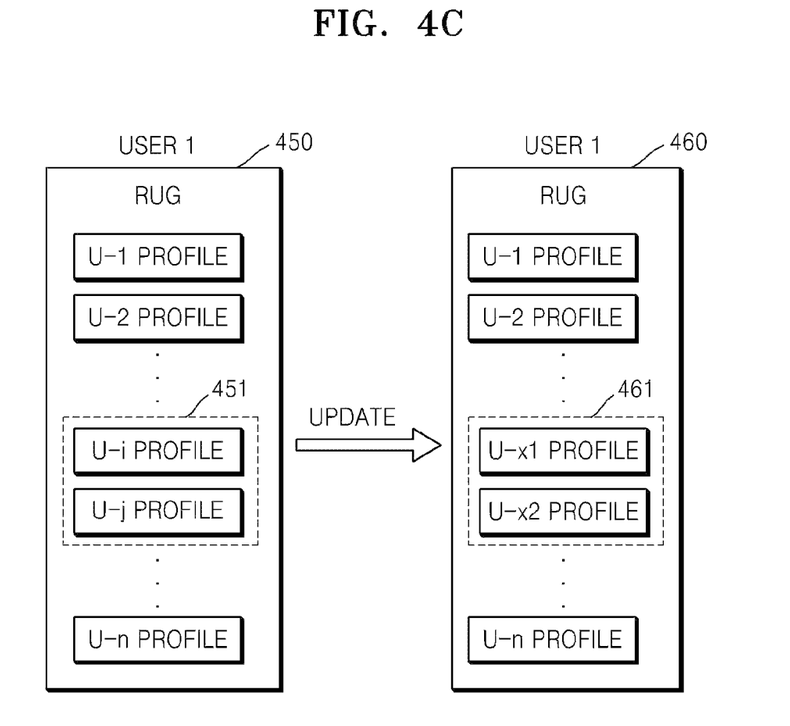

FIGS. 4A, 4B, and 4C illustrate an operational process of updating an RUG list according to an embodiment of the present invention. Referring to FIGS. 4A, 4B, 4C, the updating method according to aspects of the present invention is described in detail step by step. FIG. 4A corresponds to the operation 310, FIG. 4B corresponds to the operation 320, and FIG. 4C corresponds to the operation 330 of FIG. 3. A profile of each of users U-1 through U-n is meta data information indicating the propensity of a user through the explicit or implicit feedback of the user in the computer or terminal as described above. In the computer or terminal, a list of other users having profiles with a similar value to the value of the profile of the user are generated as a group so that an RUG is provided. Also, to evaluate each of similarities F-1 through F-n through a similarity algorithm or scheme with inputs of the profile of each user in the RUG and the profile of a corresponding terminal user is referred to as a similarity evaluation. In FIG. 4A, the profile of a "user 1" (the first user) and the profile of other users U-1 through U-n in the RUG are compared to each other.

Referring to FIG. 4A, an RUG 410 of the first user is evaluated. That is, the profile of the first user and the profiles of the users U-1 through U-n in the RUG 410 are evaluated using a similarity algorithm or scheme. The similarity algorithm or scheme compares the profiles received as inputs, as described above. As a result of the similarity evaluation, similarity evaluation points F-1 through F-n corresponding to the users U-1 through U-n are indicated in an RUG 420. In the present embodiment, two users U-p1 and U-p2 (the second users) who have the highest similarity evaluation points are selected.

Referring to FIG. 4B, an RUG 430 including respective RUGs 431 and 432 of the selected U-p1 and U-p2 is requested and received and a similarity evaluation to compare the profiles of users in each RUG 431 and 432 and the profile of the first user is performed. As a result of the evaluation, two users U-x1 and U-x2 (the third users) who have the highest similarity evaluation points are selected from the RUG 440 including respective RUGs 441 and 442 of the selected U-p1 and U-p2.

Referring to FIG. 4C, two users U-i and U-j (the fourth users 451) who have the lowest points in the similarity evaluation in FIG. 4A are selected from an RUG 450 of the first user. The two users U-l and U-j are removed from the RUG 450 and replaced by the selected users U-x1 and U-x2 (the third users 461) in an RUG 460. Thus, the first user updates the RUG 460. In addition, a series of updating processes of FIGS. 4A and 4B may be continuously performed until the similarity evaluation points F-1 through F-n of all user profiles belonging to the RUG 460 of the first user are over a threshold value.

For the update and maintenance of the RUG, a genetic algorithm GA may be used. The GA is a search algorithm based on a mechanism of the concepts of survival of the fittest and inheritance. According to the GA, only a gene that adapts well to a given environment is selected and crossed over and sometimes mutated so that a superior genetic character is reproduced to the next generation. Thus, as time passes and evolution continues, genes that are more adaptive to a given environment survive. In an aspect of the present invention, an RUG that is more optimized to the first user is generated and obtained as the series of updating processes are repeated by using the GA. However, it is understood that other types of algorithms can be used for updates and maintenance.

Figure 5:
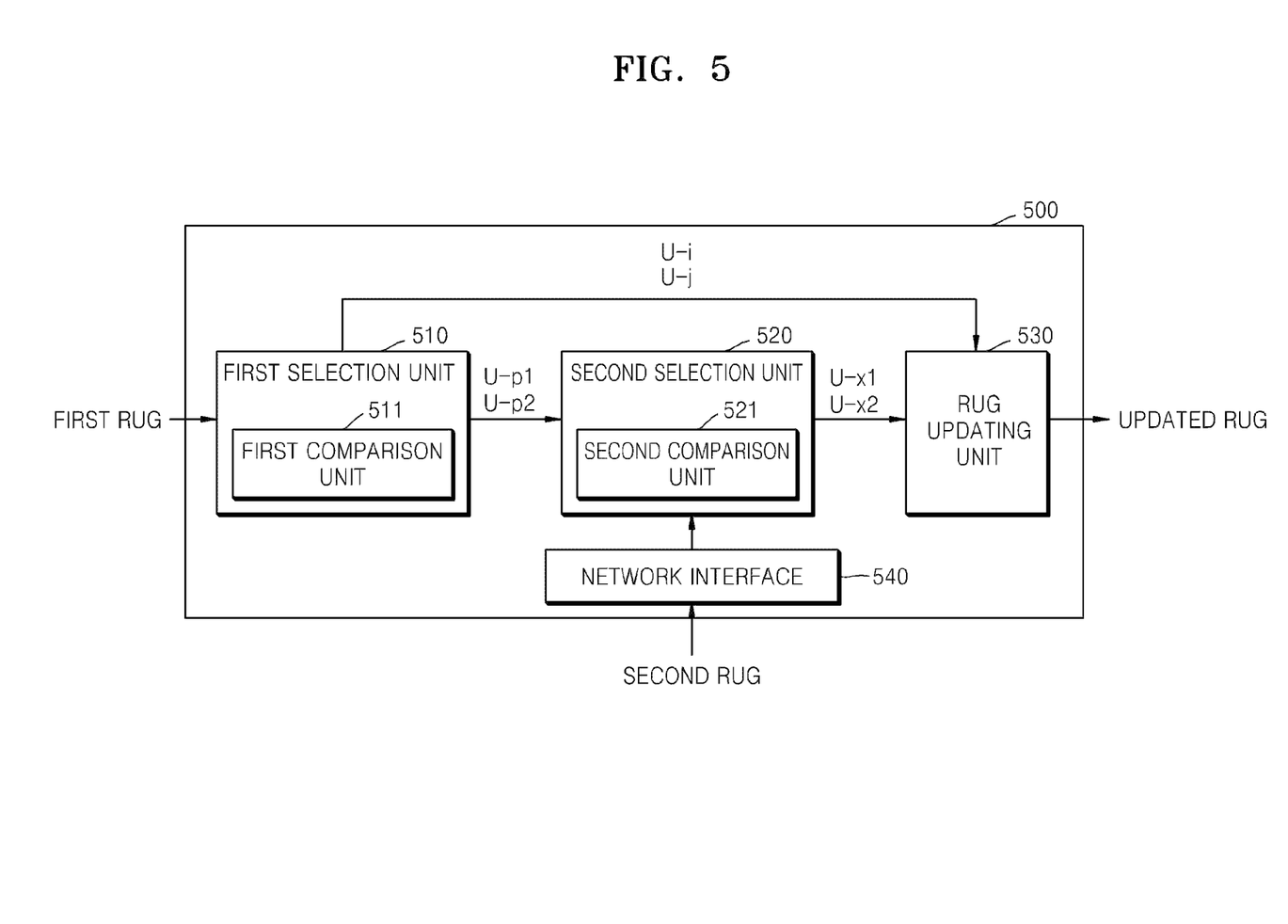
FIG. 5 is a functional block diagram illustrating an apparatus to adaptively update a recommended user group according to an embodiment of the present invention.

FIG. 5 is a functional block diagram illustrating an apparatus to adaptively update a recommended user group according to an embodiment of the present invention. Referring to FIG. 5, an updating apparatus 500 includes a first selection unit 510, a second selection unit 520, an RUG updating unit 530, and a network interface 540. The first selection unit 510 selects a predetermined number of second users (for example, U-p1 and U-p2) from a first RUG list that is a list of users having a high similarity to a first user in consuming contents. The second selection unit 520 selects a predetermined number of third users (for example, U-x1 and U-x2) having a high similarity to the first user from respective second RUG lists of the second users. The RUG updating unit 530 updates the first RUG list to include the selected third users.

As shown, the first selection unit 510 further includes a first comparison unit 511 comparing a first profile that is meta data information indicating a contents consumption propensity of the first user and a second profile of other users in the first RUG list. The first selection unit 510 selects a predetermined number of the second users (for example, U-p1 and U-p2) in order of high similarity in consuming contents based on a result of the comparison by the first comparison unit 511.

The network interface 540 receives the respective second RUG lists of the selected second users. As shown, the first user requests the second RUGs from users U-p1 and U-p2. The second selection unit 520 further includes a second comparison unit 521 to compare a profile of the first user and a profile of another user in the second RUG list received through the network interface 540. The second selection unit 520 selects a predetermined number of third users (for example, U-x1 and U-x2) in order of high similarity to the first user based on a result of the comparison by the second comparison unit 521. The RUG updating unit 530 updates the first RUG based on a result of the comparison between the first profile and the second profile by the first comparison unit 511. By way of example, the first RUG may include the selected third users (for example, U-x1 and U-x2) instead of a predetermined number of the fourth users (for example, U-l and U-j) having a lower similarity than the selected third users. The updating of the RUG may occur automatically and periodically or according to a user control.

While not required in all aspects, the structure of data used in the present invention may be recorded on a computer-readable recording medium in various ways and implemented using one or more computers and/or processors. The computer-readable recording medium includes a magnetic storage medium, for example, ROMs, floppy diskettes, or hard disks, and an optical recording medium (for example, CD-ROMs or DVDs). Also, aspects can be embodied in a carrier wave, for example, transmission through the Internet.

According to the method and apparatus to adaptively update a recommend user group according to aspects of the present invention, as the preference of a user changes, the recommend user group may be reconfigured with optimal recommend users by reflecting a corresponding preference. Thus, quality contents can be provided by recommending to a user of a corresponding terminal contents preferred by other users in the updated recommend user group list.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of updating a first recommend user group list of a first user connected to a network, the method comprising:
selecting a predetermined number of second users from the first recommend user group list, the first recommend user group list comprising a list of users having a high similarity to the first user in consuming contents, by using at least one processing device;
selecting a predetermined number of third users having a relatively high similarity to the first user from second recommend user group lists, each second recommend user group list being a recommend user group list of which each second user of the selected predetermined number of second users belongs to; and
updating the first recommend user group list to include the selected predetermined number of third users,
wherein each user from the first recommend user group and the second recommend user group is evaluated by using different similarity functions.

2. The method as claimed in claim 1, wherein the selecting of the predetermined number of second users comprises comparing a first profile indicating a contents consuming propensity of the first user with each of second profiles respectively of the users on the first recommend user group list.

3. The method as claimed in claim 2, wherein the selecting of the predetermined number of second users further comprises selecting the predetermined number of second users in order of highest similarity in consuming contents based on a result of the comparison of the first profile with each of the second profiles.

4. The method as claimed in claim 3, wherein the selecting of the predetermined number of third users comprises:
receiving the second recommend user group lists respectively of the selected predetermined number of second users; and
comparing the first profile of the first user with each of third profiles respectively of other users in the received second recommend user group lists.

5. The method as claimed in claim 4, wherein the predetermined number of third users are selected in order of highest similarity based on a result of the comparison between the first profile and each of the third profiles.

6. The method as claimed in claim 5, wherein the updating of the first recommend user group list comprises:
selecting from the first recommend user group list a predetermined number of fourth users having a lowest similarity based on a result of the comparison of the first profile with each of the second profiles; and
updating the first recommend user group list to replace the selected predetermined number of fourth users with the selected predetermined number of third users.

7. The method as claimed in claim 6, wherein the first recommended user group list is periodically and automatically updated.

8. The method as claimed in claim 2, wherein the first profile comprises meta data information indicating the contents consuming propensity.

9. The method as claimed in claim 1, wherein the selecting the predetermined number of third users comprises:
receiving the second recommend user group lists respectively of the selected predetermined number of second users; and
comparing a first profile indicating a contents consuming propensity of the first user with each of third profiles respectively of other users in the received second recommend user group lists.

10. The method as claimed in claim 9, wherein the predetermined number of third users are selected in order of highest similarity based on a result of the comparison between the first profile and each of the third profiles.

11. The method as claimed in claim 1, wherein the updating of the first recommend user group list comprises:
selecting from the first recommended user group list a predetermined number of fourth users having a relatively low similarity to the first user in consuming contents, as compared to other users from the first recommend user group list; and updating the first recommend user group list to replace the selected predetermined number of fourth users with the selected predetermined number of third users.

12. The method as claimed in claim 1, wherein the network is a peer-to-peer network.

13. The method as claimed in claim 1, further comprising receiving the second recommend user group lists respectively from the selected predetermined number of second users.

14. An apparatus to update a first recommend user group list of a first user connected to a network, the apparatus comprising:
a first selection unit to select a predetermined number of second users from the first recommend user group list, the first recommend user group list comprising a list of users having a high similarity to the first user in consuming contents, by using at least one device;
a second selection unit to select a predetermined number of third users having a relatively high similarity to the first user from second recommend user group lists, each second recommend user group list being a recommend user group list of which each second user of the selected predetermined number of second users belongs to; and
a recommend user group updating unit to update the first recommend user group list to include the selected predetermined number of third users,
wherein each user from the first recommend user group and the second recommend user group is evaluated by using different similarity functions.

15. The apparatus as claimed in claim 14, wherein the first selection unit comprises a first comparison unit to compare a first profile indicating a contents consuming propensity of the first user with each of second profiles respectively of the users on the first recommend user group list.

16. The apparatus as claimed in claim 15, wherein the first selection unit selects the predetermined number of second users in order of highest similarity in consuming contents based on a result of the comparison by the first comparison unit.

17. The apparatus as claimed in claim 16, further comprising a network interface to request and receive the second recommend user group lists respectively of the selected second users across a network,
wherein the second selection unit comprises a second comparison unit to compare the first profile of the first user with each of third profiles respectively of other users in the received second recommend user group lists.

18. The apparatus as claimed in claim 17, wherein the second selection unit selects the predetermined number of the third users in order of highest similarity based on a result of the comparison by the second comparison unit.

19. The apparatus as claimed in claim 18, wherein the recommend user group updating unit updates the first recommend user group list to replace a predetermined number of fourth users having a lowest similarity selected from the first recommend user group list, based on a result of the comparison of the first profile with the second profiles by the first comparison unit, with the selected third users selected by the second selection unit.

20. The apparatus as claimed in claim 19, wherein the first recommend user group list is periodically and automatically updated.

21. The apparatus as claimed in claim 15, wherein the first profile comprises meta data information indicating the contents consuming propensity.

22. The apparatus as claimed in claim 14, further comprising a network interface to request and receive the corresponding second recommend user group list from the selected second users across a network,
wherein the second selection unit comprises a second comparison unit to compare a first profile indicating a contents consuming property of the first user with each of third profiles respectively of other users in the received second recommend user group lists.

23. The apparatus as claimed in claim 22, wherein the second selection unit selects the predetermined number of the third users in order of highest similarity based on a result of the comparison by the second comparison unit.

24. The apparatus as claimed in claim 14, wherein the recommend user group updating unit updates the first recommend user group list to replace a predetermined number of fourth users of the first recommend user group list with the selected third users selected by the second selection unit, the predetermined number of fourth users having a relatively low similarity to the first user in consuming contents, as compared to other users from the first recommend user group list.

25. The apparatus as claimed in claim 14, wherein the network is a peer-to-peer network connecting the first user to the selected second users.

26. The apparatus as claimed in claim 14, further comprising a network interface to receive the second recommend user group lists respectively from the selected second users.

27. A non-transitory computer readable recording medium recording a program for implementing the method of claim 1 executed by one or more computers.

* * * * *

UNITED STATES PATENT AND TRADEMARK OFFICE
CERTIFICATE OF CORRECTION

PATENT NO. : 8,463,640 B2
APPLICATION NO. : 12/349117
DATED : June 11, 2013
INVENTOR(S) : Jeong-rok Jang et al.

It is certified that error appears in the above-identified patent and that said Letters Patent is hereby corrected as shown below:

Title Page, Item (54), and in the Specification, Col. 1, Title, Delete "APPARTUS" and insert
-- APPARATUS --, therefor.

Title Page, Item (74), (Attorney, Agent or Firm), Delete "Staas & Halse LLP" and insert
-- Staas & Halsey LLP --, therefor.

Signed and Sealed this
Eighth Day of October, 2013

Teresa Stanek Rea
*Deputy Director of the United States Patent and Trademark Office*